Oct. 12, 1926.

C. J. MUEND 1,602,544

SUPPLY VALVE

Filed Oct. 28, 1922

Inventor:
Charles J. Muend,
By Motowardale
Attorney.

Patented Oct. 12, 1926.

1,602,544

UNITED STATES PATENT OFFICE.

CHARLES J. MUEND, OF PHILADELPHIA, PENNSYLVANIA, ASSIGNOR TO HAINES, JONES & CADBURY INCORPORATED, A CORPORATION OF PENNSYLVANIA.

SUPPLY VALVE.

Application filed October 28, 1922. Serial No. 597,489.

My invention relates to improvements in supply valves. The object is to provide an improved valve structure which may be built into the wall of the building, usually known as the concealed valve, which may readily be repaired by removing the valve seat and other parts, and renewing the same without disturbing the housing, which is usually inserted permanently in the wall.

The device is especially applicable to bath supply valves which are concealed behind the wall of the bath room, with only the actuating handle projecting into the room.

Referring to the drawings, which illustrate merely by way of example, a suitable embodiment of my invention, Fig. 1 is a longitudinal section of the valve-housing and associated mechanism.

Figs. 1ᵃ and 1ᵇ are elevations of the valve seat member.

Similar numerals refer to similar parts throughout the several views.

Figure 1:
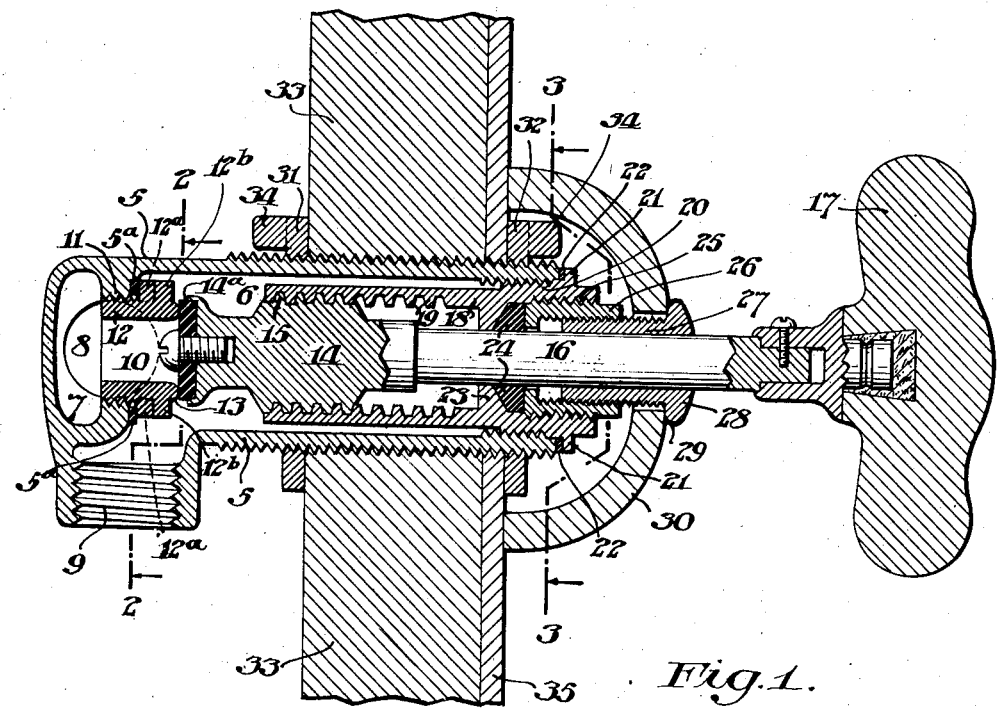
Figures 1A, 1B:
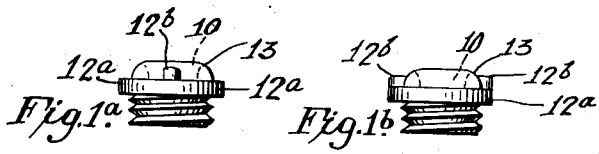
Figure 2:
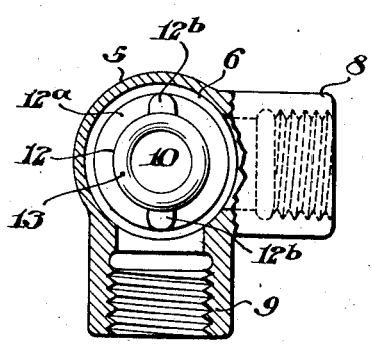
Fig. 2 is a cross section on the line 2, 2 of Fig. 1.
Figure 3:
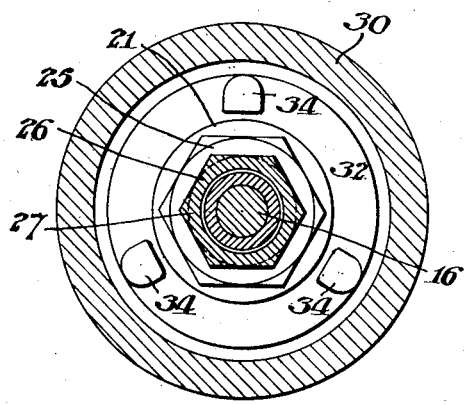
Fig. 3 is a cross section on the line 3, 3 of Fig. 1.

Referring to Fig. 1, the housing 5 is preferably a single casting, having the elongated chamber 6, and the chamber 7. The chamber 7 is provided with the threaded inlet nozzle or port, as at 8, adapted to be connected with the supply pipe, not shown, while chamber 6 is provided with the discharge nozzle or port 9, adapted to be connected to the pipe, not shown, leading to the tub or basin.

Between the chambers 6 and 7 and in close proximity to ports 8 and 9, is provided the partition having the aperture or port 10. This port is formed by the interior threaded portion 11 of the housing 5, into which is threaded the apertured removable seat member 12, having the rounded surface or seat face 13, adapted to cooperate with the washer 14ᵃ or other suitable coacting element of the valve member 14. The engaging face 13 of the seat member is closely adjacent the ports 8 and 9 and in approximately the same plane. This seat element 12 is also provided with a flange 12ᵃ for engaging a suitable washer 5ᵃ between said flange and the adjacent wall of the housing 5. The seat member 12 is also provided with the lugs or ears 12ᵇ, extending from the side of the flange 12ᵃ but ending short of the plane of the valve-seat-face 13, for convenient manipulation. The valve member 14 is provided with the peripheral threaded formation, as at 15, the spindle 16 and the operating handle or knob 17 secured thereto. The bushing or sleeve 18 is provided with the interior threaded formation, as at 19, for cooperating with the threaded formation 15 of valve member 14. Sleeve body 18 is also provided, near one end thereof, with the exterior threaded portion 20 adapted to cooperate with an interior threaded portion of the housing 5. Sleeve member 18 is also provided with the flange 21 for engaging the end of housing 5, or a washer, such as 22, preferably of lead, interposed between flange 21 and the said end of housing 5. Sleeve member 18 is also provided with the inwardly extending flange or disc formation 23, having a central opening for receiving the spindle 16, with a close but movable fit. The outer side of the disc formation 23 is bevelled for receiving the packing 24. The extreme outer end of sleeve 18 has an interior thread, as at 25, for receiving the threaded cup-shaped nut 26, which is adapted to bear upon and compress the packing 24. This cup-shaped nut 26 is also provided with an interior thread for receiving the plug 27, having a longitudinal channel for receiving the spindle 16, and provided with the knurled head 28, having the flange 29 for bearing upon the top of the semi-spherical housing or cover 30.

Two large nuts 31 and 32 are threaded onto the exterior thread of housing 5, one on each side of the wall 33, in order to hold the housing firmly in position. These nuts 31 and 32 are provided with the lugs 34, as means for manipulating the same.

With an arrangement such as described herein, it will be understood that only the housing 5 need be connected up in the roughing in. Only after the mason work is completed, including the tile work, need the other parts of the valve construction be assembled. That is to say, the securing nuts 31 and 32 are made tight in the position as shown; the seat member 12 may then be put in place, and the sleeve and valve member and the other associated parts, as shown, may then be assembled. The cover or housing 30 is secured in place by the threaded plug 27, and the knob 17 is then secured to the spindle 16. All these finished parts may be kept clean and uninjured until all the roughing work is completed. This is a distinct advantage in installing.

A still greater advantage however, of the arrangement herein shown, is that, when the valve seat becomes worn or corroded, or otherwise damaged, it is a simple matter to remove valve member 12, by first removing the sleeve 18, without any need for disturbing the housing 5, and consequently the surrounding wall, in which it is set.

When member 12 has been removed by unscrewing it from the surrounding housing 5, by means of a suitable tool for engaging the ears or lugs 12$^b$, the valve seat 13 can then be restored, or else a new member 12 may be substituted and put back in place; and thus the valve organization may be kept in order indefinitely, without disturbing the enclosing housing or the surrounding wall.

And also when the sleeve 18 has its thread, which cooperates with the thread 15 of the valve member 14, becomes worn or otherwise damaged, this sleeve may be removed and repaired or replaced, without disturbing the housing 5.

It will thus be seen that all the parts that are susceptible to wear or damage can be removed and repaired, or replaced as required, without disturbing the housing 5.

What I claim is:—

In a supply valve, the combination of an elongated cylinder formation, having nozzles at one end substantially at right angles with each other, and exteriorly threaded substantially throughout its cylindrical extension, an interiorly threaded sleeve secured within the cylinder and having a quick acting thread extending close to the nozzles, an apertured partition wall in the first mentioned formation, positioned between the two nozzles, a valve and a cooperating valve-seat member having a peripheral flange midway between its two ends, the opposite sides of said flange being in parallel planes, the valve seat face comprising an annular formation of semi-circular cross-section, the flange provided with a single pair of oppositely positioned lugs extending from the outer margin of said semicircle to the outer periphery of the flange, as and for the purpose specified.

CHARLES J. MUEND.